US006493983B1

(12) United States Patent
Lewko

(10) Patent No.: US 6,493,983 B1
(45) Date of Patent: Dec. 17, 2002

(54) FISHING DEVICE

(75) Inventor: John N. Lewko, Farmington Hills, MI (US)

(73) Assignee: Ross W. Haarz, Jr., Plymouth, MI (US)

(*) Notice: Subject to any disclaimer, the term of this patent is extended or adjusted under 35 U.S.C. 154(b) by 0 days.

(21) Appl. No.: 10/015,619

(22) Filed: Dec. 17, 2001

Related U.S. Application Data

(63) Continuation of application No. 09/488,709, filed on Jan. 21, 2000, now abandoned.

(51) Int. Cl.$^7$ ................................................. A01S 85/00
(52) U.S. Cl. ...................... 43/42.5; 43/42.04; 43/42.53; 43/36
(58) Field of Search ................................ 43/42.5, 42.52, 43/34, 35, 36, 37, 42.41, 42.1, 42.04, 42.53

(56) References Cited

U.S. PATENT DOCUMENTS

| | | |
|---|---|---|
| 321,796 A | 7/1885 | Clark |
| 378,678 A | 2/1888 | Harlow |
| 478,864 A | 7/1892 | Hunter |
| 1,197,820 A | 9/1916 | Guise |
| 1,723,193 A | 8/1929 | Mclaughlin |
| 1,808,565 A | 6/1931 | Mclaughlin |
| 1,869,111 A | 7/1932 | Mclaughlin |
| 2,087,955 A | 7/1937 | Middlemiss |
| 2,242,592 A | 5/1941 | Noxon |
| 2,415,633 A | 2/1947 | Hietala |
| 2,500,477 A | 3/1950 | Walker |
| 2,519,048 A | 8/1950 | Janisch |
| 2,597,035 A | 5/1952 | Rickard |
| 2,605,575 A | 8/1952 | Ebert |
| 2,608,786 A | 9/1952 | Schwartz |
| 2,619,756 A | 12/1952 | Hunike et al. |
| 2,619,757 A | 12/1952 | Freire |
| 2,619,758 A | 12/1952 | Freire |
| 2,629,199 A | 2/1953 | Larson |
| 2,667,006 A | 1/1954 | Lehmann, Sr. |
| 2,748,520 A | 6/1956 | Anderson |
| 2,775,058 A | 12/1956 | Roberts |
| 2,790,264 A | 4/1957 | Rickard |
| 2,860,441 A | 11/1958 | Castner |
| 2,940,208 A | 6/1960 | Oswald |
| 2,979,848 A | 4/1961 | McConnell |
| 2,982,047 A | 5/1961 | Wilshusen |
| 2,996,827 A | 8/1961 | Allen et al. |
| 3,019,544 A | 2/1962 | Hummel |
| 3,046,688 A | 7/1962 | Leisti |
| 3,059,371 A | 10/1962 | Haynie, Sr. |
| 3,100,359 A | 8/1963 | Laba |
| 3,170,263 A | 2/1965 | Purdy |
| 3,289,346 A | 12/1966 | Ehling |
| 3,492,752 A | 2/1970 | Viveiros |
| 3,890,735 A | 6/1975 | Serrill |
| 3,981,094 A | 9/1976 | Leffel |
| 4,476,646 A | 10/1984 | Weiman |
| 4,881,339 A | 11/1989 | Wirkus |
| 4,920,685 A | 5/1990 | Landuydt |
| 5,546,216 A | 8/1996 | McMillan |
| 5,946,846 A | 9/1999 | Cotton |

FOREIGN PATENT DOCUMENTS

GB 89865 7/1886 .................... 43/36

Primary Examiner—Kurt Rowan
(74) Attorney, Agent, or Firm—Dickinson Wright PLLC

(57) ABSTRACT

The present invention is an improvement in spring tensioned double hook fishing devices, generally comprising a spoon having a spring tensioned double hook slidably mounted onto a longitudinal slot extending through the spoon. The double hook is comprised of two hook arms extending from a center spring coil portion, wherein the coil portion is slidably mounted onto the forward portion of the spoon. Two hook ends are provided at opposite ends of the hook arms which can engage two connectors located on the rearward portion of the spoon, wherein the hook can be maintained in a triangularly compressed state in this manner. When a fish bites down on the device, the hook ends are jarred loose from the connectors to cause the hook to release and expand and impale the fish's mouth. Once the fish's mouth is engaged, the movement of the hook rearward along the slot helps to impale the hook deep inside the fish's mouth and reduces the likelihood of the fish escaping.

22 Claims, 2 Drawing Sheets

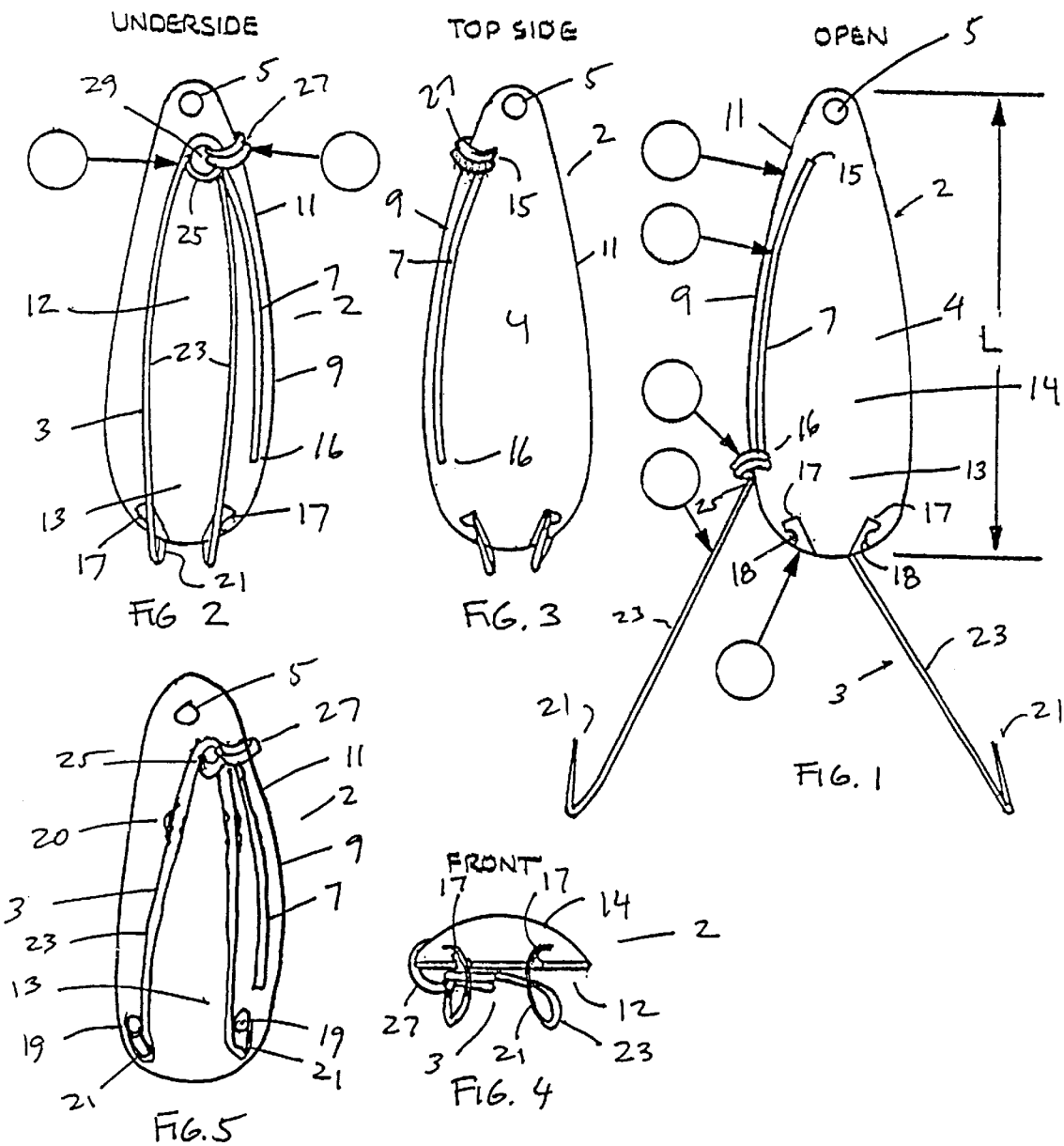

FISHING DEVICE

RELATED APPLICATIONS

This application is a continuation application, and claims the benefit of the filing date, of U.S. patent application Ser. No. 09/488,709 which was filed on Jan. 21, 2000 now abandoned,

FIELD OF THE INVENTION

The present invention relates to a fishing device, and in particular, to a fishing device having a spring tensioned double hook movably connected to a spoon.

BACKGROUND OF THE INVENTION

Several attempts have been made in the past to develop fishing hooks and lures with spring tensioned double hooks that can be compressed and then expanded when a fish bites down and pulls. Many such designs were developed without lures, such as shown in U.S. Pat. No. 2,619,758, issued to Freire, U.S. Pat. No. 2,608,786, issued to Schwartz, U.S. Pat. No. 2,982,047, issued to Wilshusen, and U.S. Pat. No. 321,796, issued to Clark. These patents are directed to spring tensioned double hooks that are held in a compressed state by a structure of some kind, such as a bracket, stem, etc. In each of these designs, the hook is released when a fish bites down and "pulls" on the hook, wherein the hook can then expand to impale the fish's mouth. The pulling motion is what causes the hook to be released and expanded.

Other designs have also been developed with spring tensioned hooks that have been used in connection with lures, such as those shown in U.S. Pat. No. 3,019,544, issued to Hummel, U.S. Pat. No. 1,197,820, issued to Guise, and U.S. Pat. No. 378,678, issued to Harlow. Like those discussed above, these patents are generally directed to fishing hooks that have releasing mechanisms that allow the hook to be released from the lure to impale the fish's mouth. Other designs have also been provided, such as those with tubular structures that maintain the double hooks in a closed position, as shown in U.S. Pat. No. 5,564,216, issued to McMillan, U.S. Pat. No. 3,100,359, issued to Laba, and U.S. Pat. No. 2,242,592, issued to Noxon. In these designs, when a fish bites down and pulls on the hook, the hook slides out of the tubular structure and is allowed to expand, which in turn impales the fish's mouth.

SUMMARY OF THE INVENTION

The present invention represents an improvement over the previous spring tensioned double hook fishing devices discussed above. The present invention generally comprises a spoon having a spring tensioned double hook slidably mounted onto a longitudinal slot extending through the spoon. The double hook is comprised of a coil spring portion with two hook arms extending outwardly therefrom at an angle, wherein the coil spring portion is slidably mounted (either directly or via a split ring) to the spoon. Two hook ends are provided at opposite ends of the hook arms, wherein the hook can be secured to the spoon in a triangularly compressed state, by positioning the coil spring portion (or split ring) on the forward-most end of the slot, and the two hook ends into two connectors located an equal distance away from the forward-most end on the rearward portion of the spoon.

The spoon is preferably provided with an elongated slot that extends along one side thereof on which the hook is mounted. The slot extends along the edge of the spoon and substantially follows the curvature of the spoon's outer perimeter to form a longitudinal support portion onto which the hook can be supported. The curvature of the slot preferably follows the shape of the spoon so that the slot does not interfere with the spoon's natural ablity to spin through the water. With the hook slidably mounted on the longitudinal support portion in this manner, the hook is allowed to slide back and forth on the spoon. Accordingly, the hook can be set in the forward-most position, and can then be released when a fish bites down on the device, wherein the hook is then allowed to travel rearward along the slot. This rearward movement makes it so that when a fish attempts to spit the spoon out of its mouth, i.e., after the hook is released, the hook expands and impales the fish deep inside the fish's mouth.

The connectors are provided to maintain the hook in its compressed state, while easily allowing the hook to be released from the spoon when a fish bites down on the device. When a fish bites down and applies pressure to the spoon, the hook ends are easily released from the connectors, wherein the double hook arms can then expand and impale the fish's mouth. This is different from the vast majority of previous spring tensioned double hook designs, which require the hook to be pulled in relation to the line for the hook to be released and expanded.

The present invention also allows the hook ends to be made without barbs so that the hook can be easily and safely released from the fish's mouth when desired. At the same time, because of the spring tensioned double hook design, the hook applies an outward pressure which causes the hook ends to penetrate deeper into the fish's mouth as the fish struggles, which in turn prevents the hook from inadvertently being released. Accordingly, the spring tensioned double hook design provides a unique barbed effect without the barbs.

The hook can also be provided with knurls on the hook arms to make it easier to squeeze. This makes it easier to compress the hook when setting it on the spoon, and easier and safer when attempting to pull the hook out of the fish's mouth.

The present invention enables the hook ends to be secured to the spoon during casting and trolling, wherein the hook is pre-tensioned so that it can absorb minor shocks that might occur, and forms a substantially compact unit with the spoon to reduce the likelihood of becoming entangled in weeds. The hook ends are designed to fit within the connectors, and the hook is adapted to fit within the underside of the spoon, which allows the spoon to spin and operate in the intended manner.

DETAILED DESCRIPTION OF THE DRAWINGS

FIG. 1 shows the present invention with a double hook in an expanded position;

FIG. 2 shows the underside of the present invention with the double hook in a closed position;

FIG. 3 shows the topside of the present invention with the double hook in the closed position;

FIG. 4 is a front view of the present invention with the double hook in the closed position;

FIG. 5 is an underside view of another embodiment of the present invention with projections extending from the spoon.

DETAILED DESCRIPTION OF THE INVENTION

Figure 6:
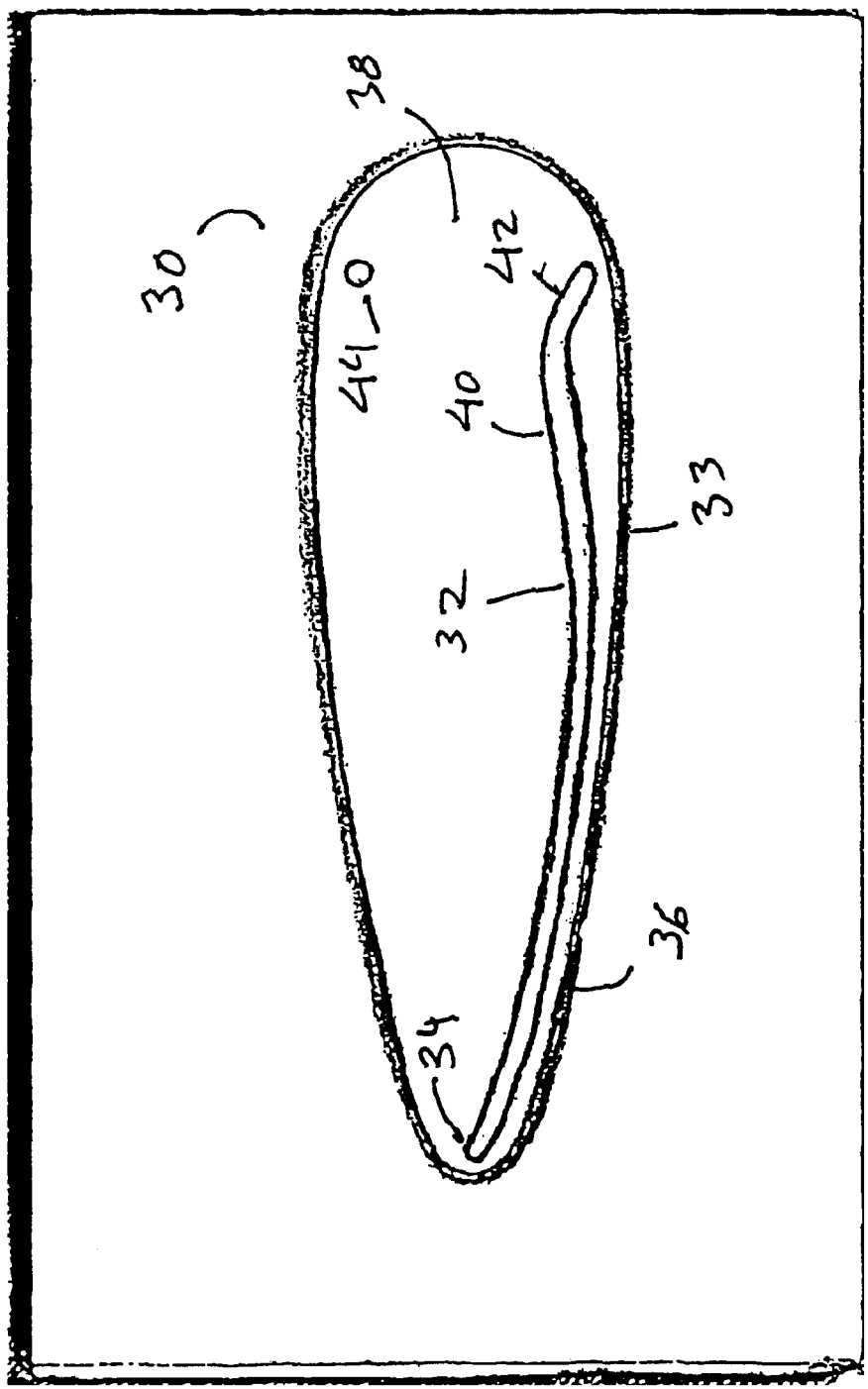
FIG. 6 shows another embodiment of the present invention wherein a slot and a hole are provided to secure the hook ends in the closed position.

The present invention 1, as shown in FIGS. 1–4, comprises a spoon 2 and hook member 3. Spoon 2 is preferably conventional in design having a curved dish-like body 4, wherein one surface on one side 12, as shown in FIG. 4, is preferably concave, and the other surface on the other side, 14, is convex, in shape. The dish-like shape preferably extends the full length of body 4, with a relatively deep dish area on the rearward portion 13 of spoon 2.

Spoon 2 is in plan view preferably in the shape of an elongated tear drop, as shown in FIG. 1, with a curved outer perimeter 11, although not necessarily so. In the embodiment shown in FIGS. 1–4, a forward opening 5 is provided through which a fishing line can be inserted and tied in a conventional manner. Forward opening 5 is preferably located at the forward-most center tip of spoon 2, with body 4 extending relatively rearward therefrom. Spoon 2 can be made of any conventional material, such as metal, plastic, fiberglass, etc., and is preferably provided with a rust resistant surface, i.e., stainless steel, paint, etc., and can be decorated in any desired manner.

Spoon 2 differs from conventional designs in that it has a slot 7 extending completely through body 4, longitudinally along one side thereof. Slot 7 preferably extends near outer perimeter 11 of spoon 2, substantially following the curvature thereof. By extending slot 7 in this manner, slot 7 forms a longitudinal support portion 9 that extends near the outer edge of spoon 2, between outer perimeter 11 and slot 7. The position and curvature of slot 7 in relation to the curvature of outer perimeter 11 determines the width of longitudinal support portion 9 along its length.

At its forward-most end 15, slot 7 preferably extends to a location slightly rearward of forward opening 5. At its rearward-most end 16, slot 7 preferably extends to a location somewhere near rearward portion 13 of spoon 2. In the embodiment shown in FIG. 1, the width of longitudinal support portion 9 is substantially constant along most of its length. This enables hook member 3 to slide relatively easily along spoon 2, as will be discussed.

Spoon 2 has two connectors 17, preferably located on rearward portion 13, which are adapted to engage hook member 3. In the embodiment shown in FIG. 1, connectors 17 are cut out slots 18 that have predetermined configurations that help to maintain hook member 3 in a closed and compressed position, as will be discussed. Connectors 17 are preferably located about an equal distance away from forward-most end 15 of slot 7. It should be apparent to one of ordinary skill in the art that connectors 17 can be made in a variety of configurations which enable hook member 3 to be secured thereto. For example, connectors 17 can be provided as shown in FIG. 1, but can also be made as projections 19, with a ball at the end extending from the underside of spoon 2, as shown in FIG. 5.

Hook member 3 is a spring tensioned double hook having a center coil spring portion 25, two hook arms 23 of substantially equal length extending from coil spring portion 25, and two hook ends 21 extending from hook arms 23 in a curved manner with sharpened points or tips thereon. Hook member 3 is preferably made from a single piece of stainless steel wire that has been cast or otherwise formed into a predetermined shape. The wire is preferably of sufficient thickness (diameter) and hardness to allow only elastic deformation to occur, such that hook member 3 is able to bend, i.e., be compressed, and quickly returned to its original shape.

Hook arms 23 preferably extend outward at an angle ranging between 30 to 90 degrees from center coil spring portion 25. The preferred angle enables hook member 3 to be easily compressed but also expand outwardly to impale the fish's mouth. The specific angle, length and size of hook member 3 can vary depending on how big spoon 2 is in relation to hook member 3. Hook member 3 is preferably sized so that it forms the largest possible triangle, i.e., as formed by the forward-most coil spring portion 25 and two distal hook ends 21, to fit within spoon body 4. In this respect, hook member 3 is adapted to be pre-tensioned in a triangularly compressed state between the forward-most end 15 of slot 7, and the two connectors 17. In this respect, the precise size of hook member 3 depends on the precise location of slot 7, and of connectors 17, and the size and shape of spoon 2 in relationship to those locations.

Coil spring portion 25 provides a spring tension force to hook arms 23, such that when hook arms 23 are compressed, coil portion 25 applies an outward pressure that causes hook arms 23 to expand. Hook ends 21 are preferably sharp enough to impale the fish's mouth, but do not require barbs since the outward pressure of coil spring portion 25 provides enough pressure to keep hook member 3 impaled within the fish's mouth. Hook ends 21 are also provided with an outward angle in relation to each other which helps to keep them within the fish's mouth and avoid premature removal. At the same time, hook ends 21 can easily and safely be released from the fish's mouth after the fish is caught and brought in since there are no barbs to prevent removal.

A separate split ring 27 can be provided to connect hook member 3 to longitudinal support portion 9, as shown in FIGS. 1–3. The eye of split ring 27 is preferably positioned on longitudinal support portion 9, and the ring 27 is coiled through central opening 29 in coil spring portion 25. With split ring 27, this embodiment has three components, i.e., ring 27, hook member 3 and spoon 2, that are connected together to form a single unit. In another embodiment, split ring 27 can be incorporated into coil spring portion 25, such that longitudinal support portion 9 extends directly through the eye of central opening 29 in coil portion 25. In this embodiment, only two pieces, i.e., hook member 3 and spoon 2, are provided. Coil spring portion 25 can be coiled onto longitudinal support portion 9 extending through central opening 29.

Hook arms 23 can also have knurls 20, as shown in FIG. 5, to make it easier to grasp and compress hook member 3 during use. Knurls 23 can be integrally preformed as part of hook member 3, and can consist of an abrasive and/or otherwise friction-increasing surface extending from hook arms 23.

In an expanded position, as shown in FIG. 1, hook arms 23 preferably extend substantially along a plane with coil spring portion 25 at the apex (also extending substantially along or near the same plane). In this manner, hook arms 23 are preferably capable of being compressed along and within substantially the same plane. Also, hook ends 21 preferably extend in a curved manner outwardly from the plane, i.e., hook ends 21 are extended from hook arms 23 in a curved manner which preferably extends outwardly away from the plane of hook arms 23, as shown in FIG. 4.

Each hook end 21 is also preferably extended outwardly away from each other to make it easier for hook member 3 to impale the fish's mouth (and provide a barbed effect without the barbs), and to set hook member 3 in the compressed state on spoon 2. In this respect, each hook end 21 can be seen in FIG. 1 as extending outwardly away from a second plane extending perpendicularly to the first plane and intersecting the appropriate hook arm 23. This helps to ensure that hook ends 21 can be engaged and maintained in a compressed state by connectors 17, as will be discussed, and helps to increase the likelihood of the fish being impaled. By angling hook ends 21 in the manner described above, hook ends 21 are easily positioned within connectors 17 and maintained therein.

Because hook member 3 is slidably attached to spoon 2 on longitudinal support portion 9, hook member 3 can slide along the length thereof. In this respect, hook member 3 is able to slide from forward-most end 15 to rearward end 16 of slot 7. This allows hook member 3 to slide from a forward portion of spoon 2 to rearward portion 13 at the appropriate time, i.e., when a fish bites and releases hook member 3.

It is important to note that the ability of hook member 3 to move rearward in relation to spoon 2 is intended to facilitate, not cause, the release of hook ends 21 from connectors 17. That is, hook member 3 can be released from connectors 17 simply by the application of pressure caused when a fish bites down on the spoon. The hook member 3 does not necessarily have to be pulled to release hook ends 21 from connectors 17. Hook member 3 is maintained in a compressed state until a fish bites down, wherein hook ends 21 are jarred loose and released from connectors 17 without the fish having to pull on the spoon. Unlike the vast majority of previous designs, there is no need to pull spoon 2 or hook member 3 for hook arms 23 to be released and expanded.

In this respect, hook member 3 is configured and sized such that when it is positioned at the forward-most end 15 of slot 7, only hook ends 21 engage the engaging sections of connectors 17. That is, hook member 3 is maintained in a triangularly compressed state by virtue of the outward pressure applied by hook ends 21 against connectors 17, and the forward-most end of hook member 3 being compressed within the forward-most position of slot 7. With hook member 3 pre-tensioned in this position, it can absorb minor shocks to prevent premature release, while enabling hook ends 21 to be easily released from connectors 17 when a fish bites down and loosens hook ends 21 from connectors 17.

The movement of hook member 3 rearward away from spoon 2, as shown in FIG. 1, is desirable because it accounts for the possibility that the fish will attempt to spit spoon 2 out of its mouth after hook member 3 is released and expanded. That is, when hook member 3 is released, and spoon 2 continues to be trolled through the water, spoon 2 can be pulled away from hook member 3, which enables hook arms 23 to be freed, and therefore, hook ends 21 to be impaled deeper inside the fish's mouth. That is, when the fish attempts to spit spoon 2 out, hook member 3 can slide rearward in relation to spoon 2, wherein the expansion of hook arms 23 can cause hook ends 21 to impale deep inside the fish's mouth. With hook arms 23 being movable away from any interference by spoon 2, hook member 3 is free to be squeezed by the fish's mouth, which allows the hook to penetrate deeper into the mouth as the fish struggles.

In another embodiment of the present invention, connectors 17 are projections 19 which project outwardly from the underside 12 of spoon 2, as shown in FIG. 5. In this respect, hook member 3 can be compressed such that hook ends are located between the two projections 19, and can then apply outward pressure on the inner portions thereof. Projections 19 can be a stem with a small ball located at the tip, wherein the ball helps to maintain hook ends 25 in the compressed state. In this manner, hook member 3 operates in substantially the same manner as in the embodiment previously discussed, wherein hook arms 23 expand open upon being jarred loose when a fish bites down on the device, wherein hook ends 21 can impale the fish's mouth.

In another embodiment of the present invention, as shown in FIG. 6, spoon 30 has a slightly different configuration. The spoon 30 itself is much like any conventional spoon, as in the previous embodiments, but slot 32 in this embodiment extends almost all the way to the forward portion of spoon 30. That is, rather than having a separate forward opening 5, slot 32 extends all the way to the forward portion of spoon 30, such that the forward-most end 34 of slot 32 serves as a central opening to secure the spoon to the fishing line. Forward-most end 34 of slot 32 also serves as the forward-most position of hook member 3 when set and compressed onto spoon 30. And, since forward-most end 34 is positioned at the center of spoon 30, it also allows hook member 3 to be used without a separate split ring 27, wherein coil spring portion 25 has an opening 29 onto which hook member 3 can be directly and centrally mounted onto spoon 30.

Slot 32 otherwise extends substantially along one side of spoon 30 in a similar manner forming a longitudinal support portion 36 that is substantially constant in width along its length, i.e., at least along the forward area thereof. In this embodiment, however, slot 32 begins to taper away from outer perimeter 33 of spoon 30 about three-quarters of the way as it transitions rearward. Slot 32 is tapered slightly inwardly at that point, away from outer perimeter 33, along rear portion 40, and is then transitioned back outwardly toward outer perimeter 33 of spoon 30, forming a substantially straight rearward portion 42 having an outward vector component. In this respect, rearward portion 42 acts as one of the connectors, wherein rearward portion 42 forms an opening into which one of the hook ends 21 can be inserted and secured.

On the opposite side of spoon 30 (from where rearward portion 42 is located) is a connector 44 which is an opening or hole that serves as the other connector for the other hook end 21. In this manner, one of the hook ends 21 can be anchored in the single round hole 44, and the other hook end 21 can be positioned within rearward portion 42, which has a straight portion that angles in the opposite direction as the curvature of hook end 21. This configuration allows rearward portion 42 to maintain the hook end 21 in place when hook member 3 is set. The shape and orientation of rearward portion 42 is such that it helps to secure one of the hook ends 21, while at the same time, allowing it to easily be released when a fish bites down on the device.

In this embodiment, hook member 3 is positioned on slot 32 in much the same manner as on slot 7 in the previous embodiments, except with opening 29 of hook member 3 being directly mounted on longitudinal support portion 36. Coil spring portion can therefore be positioned at the forward-most end 34 of slot 32 in order to place hook member 3 dead center on spoon 30 in its compressed state. Hook arms 23 can then be compressed such that hook ends 21 are inserted into straight rearward portion 42, and opening 44, respectively. This arrangement enables hook member 3 to be triangularly compressed within spoon 30. The three points on spoon 30 which make up the triangulation on hook member 3 are specifically located to form the largest possible triangle within spoon body 4.

In use, spoon 2 of the present invention can be secured to a fishing line by forward opening 5 (or directly to forward-most end 34 of slot 32 in the embodiment of FIG. 6). To set hook member 3, split ring 27 is positioned at the forward-most end 15 of slot 7, such that hook member 3 is in a forward position on longitudinal support portion 9, and on the underside, 12, of spoon 2, as shown in FIGS. 2–4. Split ring 27 in this embodiment helps to center the forward end of hook member 3 in relation to spoon 2, as shown in FIG. 2. In the embodiment of FIG. 6, however, coil spring portion 25 can be directly positioned on forward-most end 34 of slot 32, wherein hook member 3 can be centered directly on spoon 30 (since forward-most end 34 is centered unlike forward-most end 15).

With hook member 3 in this position, hook arms 23 can be compressed against the tension of coil spring portion 25, until hook ends 21 are fitted within and inside connectors 17, as shown in FIGS. 2 and 3, or projections 19, as shown in FIG. 5, or rearward portion 42 and opening 44, respectively, as shown in FIG. 6. The connectors, 17, 19, 42 and 44, each have a configuration that provides a supporting surface against which pressure from hook ends 21 can be applied. Positioning hook member 3 in this manner makes it possible to maintain hook member 3 in a triangularly compressed state, between the three support points formed on the spoon. In this respect, hook member 3 is capable of being pre-tensioned and secured to spoon 2 or 30, such that it absorbs minor shocks and resists entanglement in weeds during use. The configuration of spoon 2 or 30, and the compact position of hook member 3 on spoon body 4, helps to enable spoon 2 or 30 to spin properly through water during trolling.

When a fish bites down onto spoon 2 or 30, the fish's mouth engages hook member 3 and jars it loose from connectors, 17, 19, 42 or 44. In the embodiment of FIGS. 1–5, the pressure from the fish's mouth biting down causes hook ends 21 to be released from connectors 17 or 19, which in turn causes hook member 3 to expand. This enables hook ends 21 to impale the fish's mouth.

In the embodiment of FIG. 6, when a fish bites down on the device, the one hook end 21 inserted into rearward portion 42 is released first. Because rearward portion 42 is angled outward, hook end 21 can be released when the hook end moves inward and upward along rearward portion 42, beyond the point where the straight rearward portion 42 begins, wherein the outward pressure of coil spring portion 25 causes hook member to spring open and release. The length of rearward portion 42 is predetermined to allow some movement of hook end 21 without releasing, which enables hook member 3 to be "springy" so that it will not release when casting, when the device hits the water, or when being squeezed between underwater plants, etc.

Instantaneously, at the moment one hook end 21 is released from rearward portion 42, hook member 3 expands and exerts an outward pressure to hook arms 23 and hook ends 21, which causes the one free hook end 21 to be pressed against the fish's mouth. When the fish feels this, the fish opens its mouth and tries to spit the spoon out, but because the expansion of hook member 3 allows it to slide rearward in relation to spoon 30, the other hook end 21 is released from opening 44, which enables both hook ends 21 to impale the fish's mouth. While these steps are described in the order in which they are likely to occur, the actual occurrence of events is substantially instantaneous, in that both hook ends 21 are automatically released and expanded almost in an instant to impale the fish's mouth. The combination of the structures and elements discussed above help to enable hook member 3 to expand quickly to impale the fish's mouth at the precise moment when the fish bites down on the device.

The present invention has been described in relation to the specific embodiments discussed above. Nevertheless, the present invention is not intended to be limited to the embodiments disclosed herein. Rather, it is intended that variations of the present invention can be adapted which may not specifically be disclosed herein, but which may nevertheless fall within the scope of the claims.

What is claimed is:

1. A fishing device comprising:

a hook member having a center portion and two hook arms each having a pointed hook end thereon;

a spoon having an outer perimeter, a forward portion for connecting said spoon to a fishing line, a rearward portion, and a slot extending longitudinally along one side thereof, wherein said slot extends substantially rearward from a location at or near said forward portion, and substantially follows said one side of said spoon along said outer perimeter, such that a longitudinal support portion, on which said hook member can be slidably mounted, is formed along said one side; and wherein said hook member is spring tensioned such that it can be compressed and held in a compressed state by a forward end of said slot and two connectors on said spoon, and can be released from said connectors to expand to an expanded state when a fish bites down on said device, wherein the tension on said hook member causes said hook arms to expand outward in relation to each other when released.

2. The device of claim 1, wherein said hook member is barbless and formed from a single piece of stainless steel that has been shaped in a predetermined manner, wherein said center portion comprises a coil spring which can exert outward pressure onto said hook arms.

3. The device of claim 2, wherein said hook arms extend outward from said center portion in said expanded state, forming an angle with said center portion.

4. The device of claim 1, wherein said hook arms in said expanded state extend substantially along a first plane, and said hook ends are configured such that they extend predominantly away from said first plane in a substantially curved manner.

5. The device of claim 1, wherein said hook ends are angled away from each other, wherein said angle helps to maintain said hook member on said connectors and increases said hook member's ability to impale said fish's mouth.

6. The device of claim 1, wherein said hook member is slidably mounted on said spoon such that when said fish bites down on said device, said hook member can be pulled rearwardly in relation to said spoon.

7. The device of claim 1, wherein a hole is provided on said forward portion of said spoon on which a fishing line can be secured.

8. The device of claim 7, wherein said two connectors are provided for maintaining said hook member in said compressed state, said two connectors being substantially equidistant from said hole and being adapted to engage said hook ends.

9. The device of claim 1, wherein said connectors comprise two cut out slots in said spoon, said hook ends being adapted such that they can be inserted into said cut out slots when said hook member is in said compressed state, said hook member being in tension such that it exerts an outward pressure to maintain said hook ends in said cut out slots.

10. The device of claim 1, wherein said connectors comprise two projections extending from said spoon, said hook ends being adapted such that they can engage and be positioned between said projections when said hook member is in said compressed state, said hook member being in tension such that it exerts an outward pressure on said hook ends to maintain said hook ends against said projections.

11. The device of claim 1, wherein said forward end of said slot is adapted to enable a fishing line to be secured to said device.

12. The device of claim 1, wherein only a portion of said slot follows along said outer perimeter of said spoon to form said longitudinal support portion thereon, wherein a rearward portion of said slot is curved in a predetermined manner away from said outer perimeter, and has a rearward section extending toward said outer perimeter, wherein said rearward section of said slot is adapted to serve as one of said connectors.

13. The device of claim 12, wherein another of said two connectors is a hole extending through said spoon, said hole and said rearward section of said slot being substantially equidistant from said forward portion of said spoon, thereby forming a triangular orientation thereon.

14. The device of claim 13, wherein one of said hook ends is adapted to engage said rearward section of said slot, and another of said hook ends is adapted to engage said hole, such that said hook member can be maintained in a triangularly compressed state on said spoon.

15. The device of claim 1, wherein an engaging portion is provided on each of said hook arms to enable said hook member to be easily compressed.

16. The device of claim 1, wherein said spoon has a first surface that is curved in a convex manner, and a second surface that is curved in a concave manner, wherein said hook member can be positioned on said spoon such that it is predominantly located on a side adjacent said second surface.

17. A method of forming a fishing device, comprising:

providing a spoon having an outer perimeter, a forward portion for connecting a fishing line thereto, a rearward portion having two connectors thereon, and a longitudinal slot extending substantially in a fore and aft direction along one side of said spoon;

slidably mounting a spring tensioned hook member onto said slot, wherein said hook member has a center portion and two hook arms, and each hook arm has a pointed hook end thereon;

adapting said hook member such that said center portion can be positioned on said slot near a forward end thereof, and said hook arms can be compressed to cause said hook ends to engage said two connectors on said spoon, wherein said hook member can be held by said connectors on said spoon in a compressed state; and adapting said fishing device such that when a fish bites down on said device, the pressure of said fish biting down on said device can cause said hook member to be released from said connectors, and said hook arms to be expanded outward to an expanded position, wherein the spring tension on said hook member can cause said hook ends to impale said fish's mouth.

18. The method of claim 17, wherein the method comprises the additional step of allowing said hook member to slide rearward along said spoon by the application of a pulling motion.

19. The method of claim 17, wherein the method comprises the additional step of providing a hook member with hook ends that are barbless, such that said hook member can be easily released from said fish's mouth by compressing said hook arms together.

20. A fishing device comprising:

a spoon having an outer perimeter and a slot extending longitudinally along one side thereof, wherein a first portion of said slot substantially follows said one side of said spoon along said outer perimeter thereof, and a rearward portion of said slot is bent or curved in a predetermined manner away from said outer perimeter, and has a rearward section extending toward said outer perimeter;

a hook member having a center portion and two hook arms thereon, said hook member being slidably mounted on said slot, wherein said hook member is spring tensioned such that it can be compressed and held in a compressed state by a forward end of said slot and two connectors on said spoon, wherein said rearward section of said slot serves as one of said connectors; and wherein said hook member can be released from said connectors to expand to an expanded state when a fish bites down on said device, wherein the tension on said hook member can cause said hook arms to expand outward in relation to each other when released.

21. The device of claim 20, wherein another of said two connectors is a hole extending through said spoon, said hole and said rearward section of said slot being substantially equidistant from said forward end of said slot, thereby forming a triangular orientation thereon.

22. The device of claim 21, wherein one of said hook arms is adapted to engage said rearward section of said slot, and another of said hook arms is adapted to engage said hole, such that said hook member can be maintained in a triangularly compressed state on said spoon.

* * * * *